United States Patent [19]

Brax et al.

[11] 4,082,829
[45] Apr. 4, 1978

[54] PROCESS FOR MELT EXTRUDING COATING GRADE SARAN

[75] Inventors: Harri J. Brax; Joseph F. Porinchak, both of Spartanburg; Alan S. Weinberg, Greenville, all of S.C.

[73] Assignee: W. R. Grace & Co., Duncan, S.C.

[21] Appl. No.: 646,110

[22] Filed: Jan. 2, 1976

Related U.S. Application Data

[62] Division of Ser. No. 344,005, Mar. 22, 1973, Pat. No. 3,953,557, which is a division of Ser. No. 129,501, Mar. 30, 1971, Pat. No. 3,741,253.

[51] Int. Cl.² .......................................... C08F 214/08
[52] U.S. Cl. ................................... 264/209; 260/899; 264/173
[58] Field of Search ................. 264/95, 173, 176 R, 264/178 R, 209, 210 R; 156/244; 260/899, 890

[56] References Cited

U.S. PATENT DOCUMENTS

| 2,891,870 | 6/1959 | Selby et al. | 426/124 |
| 2,909,449 | 10/1959 | Banigan | 260/899 |
| 2,961,323 | 11/1960 | Underwood et al. | 99/176 |
| 3,031,332 | 4/1962 | Rothacker | 264/25 |
| 3,108,017 | 10/1963 | Messwarb et al. | 260/899 |
| 3,240,742 | 3/1966 | Hahn et al. | 260/899 |
| 3,524,795 | 8/1970 | Peterson | 428/216 |
| 3,552,090 | 1/1971 | Roberts et al. | 53/385 |
| 3,662,028 | 5/1972 | Wineland | 260/899 |
| 3,707,590 | 12/1972 | Wiggins et al. | 264/173 |

FOREIGN PATENT DOCUMENTS 743,021  9/1966  Canada ............................ 260/899

*Primary Examiner*—Jeffrey R. Thurlow
*Attorney, Agent, or Firm*—John J. Toney; William D. Lee, Jr.; John B. Hardaway

[57] ABSTRACT

A melt extrusion process is taught which employs a saran of the type generally considered suitable for liquid coating.

3 Claims, 5 Drawing Figures

PROCESS FOR MELT EXTRUDING COATING GRADE SARAN

The is a division of application Ser. No. 344,055 filed Mar. 22, 1973 now U.S. Pat. 3,953,557 which is a division of application Ser. No. 129,501 filed Mar. 30, 1971 now U.S. Pat. 3,741,253.

BACKGROUND OF THE INVENTION

This invention relates to composition for forming films, coatings, and laminates formed from the compositions, methods for producing them and the uses of the materials in packaging products, especially food products such as bone-in fresh red meats.

In the past barrier laminates containing a barrier layer of saran together with layers of a copolymer of ethylene vinyl acetate with an outer layer of polyethylene have been used to package foodstuffs including meats as shown in U.S. Pat. No. 3,549,389. Other saran to polyethylene laminates and the like have also been known as shown by Canadian Pat. No. 743,021; and U.S. Pats. Nos. 3,031,332; 2,986,576 and 2,956,969. However with such laminates it has generally been necessary to employ bone puncture protective means such as those shown in U.S. Pat. No. 2,891,870. In addition, it may be seen that the laminates of the prior art have required separate plies to provide the necessary abuse resistance of one lamina, the necessary adhesive characteristics of still other laminas and the barrier properties of still another lamina or various special treatments to obtain suitable adhesion characteristics between the plies. In addition ethylene copolymers having a substantial vinyl acetate content have not been believed to be satisfactory for an outer or inner lamina or coating that must be abuse resistant. Generally only those ethylene vinyl acetate copolymers having vinyl acetate contents below 5% have been felt to be at all suitable for such use. These are only a few of the shortcomings of the prior art.

There is therefore a need for a laminate of simplified construction having all the necessary characteristics for packaging bone-in cuts of meat and a wide variety of other items without the use of special packaging aids.

SUMMARY OF THE INVENTION

By an aspect of the invention a method for producing an abuse resistant polymer film is provided that includes forming the film from a polymer material having a narrow molecular weight distribution with a generally random molecular weight distribution therebetween. The general weight distribution is preferably approximately that of the standard bell curve. The preferred polymer material is based on ethylene vinyl acetate containing 5-20% vinyl acetate. More preferably the polymer is a copolymer of ethylene and vinyl acetate containing 8-12% vinyl acetate.

The above described polymer material is preferably formed onto the outer poly of a laminate. This outer ply could be an inside ply or coating in a bag, for example, by outside ply it is meant that it is a surface or exposed ply that may be subject to external abuse, abuse by an object engaging the coating. The laminate preferably includes an inside ply of a barrier material, preferably one based on saran. The saran is preferably a new saran composition comprising a polymer of vinylidene chloride having at least 50% vinylidene chloride and being a blend of 5-40% suspension polymer and 60-95% emulsion polymer, preferably with an epoxy resin blended therewith in an amount of 2-10%.

An alternate inside barrier ply is a melt extruded layer of saran that is a liquid coating grade of vinylidene chloride and vinyl chloride copolymer having 5-15% vinyl chloride. In a preferred form the liquid coating grade copolymer of vinylidene chloride and vinyl chloride is present in an amount of from 5-100% with the remainder being 2-10% epoxy resin and melt extrusion grade saran.

By another aspect of the invention improved films and laminates are provided having the features described above with respect to the method of their creation.

An aspect of the invention provides a very advantageous method of manufacturing a three-ply laminate having the inside barrier layer (described above) sandwiched between outside plies of the outer ply described above. By this method the third ply is melt extruded as a tubular film, solidified and cross linked, preferably by irradiation at a dosage of 2-15 megareps. The irradiated tube is passed to a coating die where the second ply is melt extruded as a second tubular film, coated on and directly adhered to the irradiated tube forming a two-ply tubular film. The two-ply tubular film is passed to a coating die, preferably while still hot, and the first ply is extruded as a tubular film coated on and directly adhered to the second tubular film forming a three-ply tubular film laminate. The three-ply tubular film is solidified and the tubing is stretched biaxially and thus biaxially oriented to provide a shrink tension of from 200-500 psi and a free shrink of at least 40% at 205° F.

By still another aspect of the invention a method is provided for preventing punctures and leaks in packaging bone-in cuts of meat in heat sealable plastic films. The method includes coating the inside of the plastic film that will be exposed to the cut of meat and bone with a polymer material that is solid at room temperature and has a narrow molecular weight distribution. The meat is enclosed in the film to form a package and then heat is applied to the package to shrink the film against the bone-in cut of meat.

It is therefore an object of this invention to provide compositions of wide utility, having both advantageous manufacturing utility and end use utility, and providing end products that have not only wide utility but superior performance and low cost.

The invention may be better understood by reference to the following detailed description and drawings in which.

DESCRIPTION OF THE PREFERRED EMBODIMENTS

Unless otherwise identified specifically herein, percentage contents refer to the weight percent of each ingredient in the total composition including all additives. Thus, when a composition includes additional materials not affecting the "essential character" such as stabilizers, pigmenting agents, processing aids such as waxes, deodorizing agents, anti-static agents, antiblocking agents, etc., these materials will be understood to slightly reduce the actual content of recited materials when they are given on the basis of their percentage content in the composition.

When a polymer material is set forth as being based on ethylene and vinyl acetate, this indicates that the ethylene and vinyl acetate are polymerized but that other ingredients may be included in the polymer. Thus the polymer could be a terpolymer or some other polymer than a copolymer so long as the predominant polymer portions are those recited. The same is true of the saran or vinylidene chloride polymers. The term "saran" is used herein in its normal commercial sense with reference to polymers made by polymerizing vinylidene chloride and vinyl chloride. Additional monomers suitable for polymerization with the vinyl chloride and vinylidene chloride to provide a barrier material are many and well known and therefore are not listed here. When a barrier layer is referred to broadly, vinylidene chloride polymers are those most commonly used but in special instances other materials such as vinyl chloride polymers, fluorocarbon polymers and many others may be used. As is well known, many of the polymer materials, such as those referred to, include additives that are not considered to change the "essential character" of the material. A number of the additives are listed above.

Figure 1:
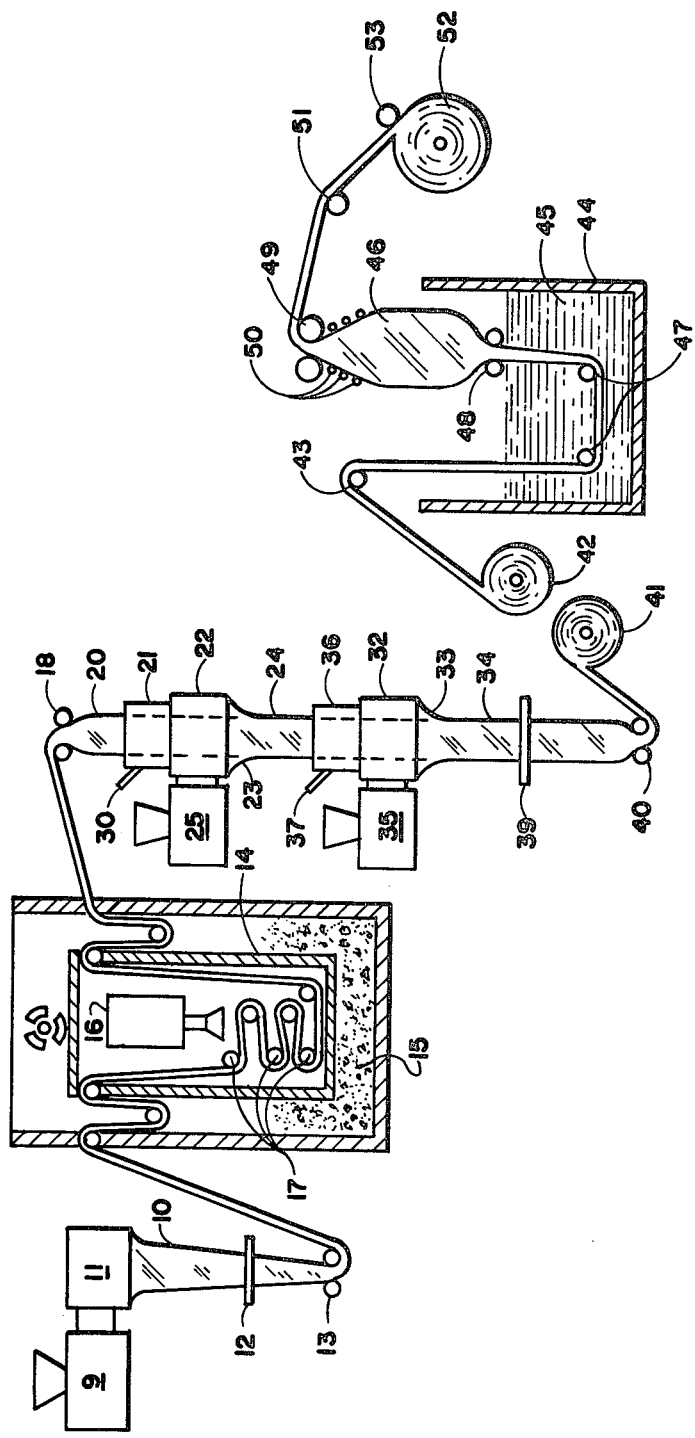
FIG. 1 is a schematic diagram of a preferred method for carrying out the invention.

Referring now to FIG. 1, a conventional extruder 9 is shown into which is fed a polymer material having a narrow molecular weight distribution, preferably a polymer material based on ethylene and vinyl acetate having 5-20% vinyl acetate, and more preferably 8-12% vinyl acetate. The molecular weight distribution of the polymer is preferably a generally random molecular weight distribution most preferably in the general distribution of the standard bell curve distribution which is represented by Line A of FIG. 5. It may be observed that this is not an exact bell curve which would be unusual in a commercial polymer material.

Figure 5:
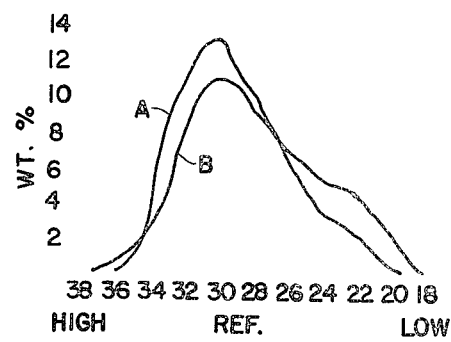
FIG. 5 is a graph of molecular weights.

Molecular weight distribution as used herein is determined by use of a gel permeation chromatograph. It has been found that a polymer having the molecular weight distribution of curve A in FIG. 5 is satisfactory while a polymer having a molecular weight distribution of curve B is unsatisfactory for the films of this invention. These curves were analyzed by standard statistical techniques and the following determinations made:

|  | Curve A | Curve B |
|---|---|---|
| standard deviation (sd) | 3.07 | 3.65 |
| Number Average Molecular Weight (M) | 28.96 | 27.89 |
| Coefficient of Variation $\frac{(100)(sd)}{M}$ | 10.62 | 13.08 |
| Area under curve, ±10% of M | 64.32 | 50.72 |

Thus it has been found that a suitable polymer has a coefficient of variation which does not exceed 13. The number average molecular weight is the weighted average molecular weight which is the summation of the molecular weight shown on the absicca of FIG. 5 times the number of molecules of a given weight represented by the percent shown on the ordinate.

More particularly it has been shown that for polymers having a number average molecular weight of about 28 (curves A&B) that the area under the distribution curve should be greater than that shown by curve B in an area bounded by an abscissa of ± 10% of the number average molecular weight, a lower ordinate of o and the upper ordinates represented by the distribution curve. Preferably the area will be the similar area for curve A less 50%, more preferably 25%, of the difference in these areas for curve A and curve B. In other areas for polymers having a number average molecular weight of about 28, the area is greater than 50.72, preferably greater than 57.57, more preferably greater than 60.94.

The tubing 10 is extruded downwardly from die head 11 which is fed from extruder 9. The extruded tubing is 10-30 mils thick, more preferably 15-25 mils thick. After cooling or quenching by water spray from cooling ring 12, the tubing is collapsed by pinch rollers 13 and is fed through an irradiation vault 14 surrounded by shielding 15 where it is irradiated with electrons from an iron core transformer accelerator 16. Other accelerators such as a Vander Graff or resonating transformer may be used. The radiation is not limited to electrons from an accelerator since any ionizing radiation may be used. The unit or radiation employed here is the RAD which is defined as the amount of radiation which will dissipate 100 ergs of energy per gram of irradiated material by ionizing particles. The MR is one million ($10^6$) RAD.

In special instances it may be desirable to cross link the polymer through other means such as chemical cross linking agents. In the preferred procedure, however, irradiation is employed and preferably as described.

The time of irradiation of the ethylene vinyl acetate tubing 10 is not critical but need only be enough to give the required dosage to effect the desired amount of cross linking. In the present embodiment the tubing 10 is preferably irradiated at a dosage of 2-15 MR and more preferably at a dosage of 2-10 MR.

The tubing 10 is guided through the irradiation vault 14 by rollers 17. After irradiation the tubing 10 goes through pinch rollers 18 following which it is slightly inflated by a trapped bubble 20. The tubing is not significantly stretched longitudinally as the rollers 18 are driven at about the same speed as rollers 13. The tubing is inflated only enough to provide a substantially circular tubing without significant transverse orientation.

The slightly inflated irradiated tubing 10 is passed through vacuum chamber 21 to a laminating or coating die 22. A second tubular film 23 is melt extruded from the coating die 22 and coated onto and directly adhered to the irradiated tube 10 to form a two-ply tubular film or laminate 24. The second tubular film 23 is preferably a barrier ply. The barrier ply is preferably a polymer material based on saran or a polymer of vinylidene having at least 50% vinylidene and more preferably a polymer or copolymer of vinylidene chloride and vinyl chloride having 5-40% vinyl chloride, most preferably 15-30% vinyl chloride. This composition is preferably 5-40% suspension polymer and 60-95% emulsion polymer, more preferably 5-15% suspension polymer and 85-95% emulsion polymer. The preferred barrier layer also includes in combination therewith 2-10% epoxy resin more preferably 4-6% epoxy resin. Thus the preferred barrier layer is a saran film of a copolymer of vinylidene chloride and vinyl chloride having 5-40% vinyl chloride combined with 2-10% epoxy resin with the saran being a blend of from 5-40% suspension polymer and 60-95% emulsion polymer. The more preferred barrier film would be a saram that is a vinylidene chloride/vinyl chloride having 15-30% vinyl chloride combined with 4–6% epoxy resin, the copolymer being a blend of 5–15% suspension polymer and 85–95% emulsion polymer.

As used herein epoxy resin means a high viscosity thermoset resin as distinct from epoxidized oils which are the usual epoxy plasticizers and are normally formed of epoxidized natural oil and are much less viscous.

It is quite unexpected that the blend of emulsion and suspension resins, particularly those of the saran or vinylidene type, can be melt extruded and formed into a good quality biaxially oriented film. Normally the suspension resin would be expected to cause gels to form in the emulsion resin during extrusion. In the present case, however, the suspension polymer seems to act as a stabilizer rather than causing gels in the emulsion polymer film. While we would not want to be held to the following beliefs, it is believed that the suspension polymer melts more slowly in the barrel of the extruder and acts as a securing agent during the passage of the blend through the extruder preventing a build up of the saran on the extruder barrel and its decomposition. The emulsion polymer tends to stick when it melts and the suspension polymer acts somewhat like ball bearings moving it along. Of course, prior to extrusion and adjacent the die the suspension polymer is also melted. It has been found that going above 20% in suspension polymer content usually causes difficulty with film orientation. Only with very careful handling is it possible to go up to 40% suspension polymer content. Crystals form more rapidly in a suspension polymer film. Thus the suspension polymer acts as a contaminant in the emulsion polymer in the sense that the suspension polymer crystallizes so rapidly that it does not permit sufficient time to achieve sufficient drawdown during the orientation step.

We have found it possible to operate at extrusion temperatures between the normal processing conditions for the two polymers, in other words between 280° and 340° F. It was not originally thought that the blended materials would be compatible in the melted polymer state because of the differential melting rates between the two polymers.

Thus the extruder is preferably operated at a barrel temperature of 200°–320° F, more preferably 250°–300° F and the extrusion die is preferably operated at a temperature of from 280°–340° F more preferably 295°–315° F. The extruded tubing is 1–5 mils thick, more preferably 2–4 mils thick.

The extruder 25 is conventional, e.g., a standard 3¼ inch extruder. The die 22 is a circular cross head die which has an adapter 26 (FIG. 2) attached thereto to provide in its preferred form a 3½ inch opening 27 for the slightly inflated tubing 10.

Figure 2:
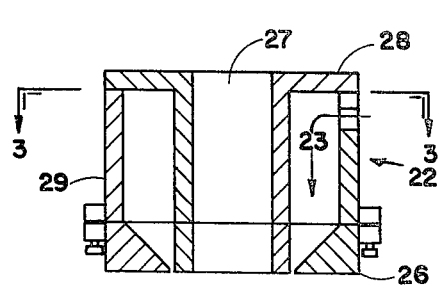
FIG. 2 is a cross section of the die head used in the present invention.
Figure 3:
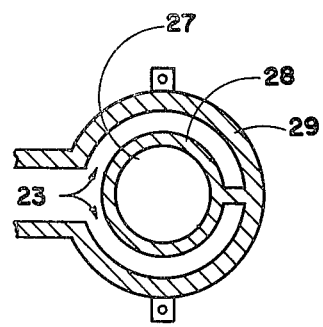
FIG. 3 is a view taken along line 3—3 of FIG. 2.

The details of the die 22 may be better appreciated by referring to FIGS. 2 and 3. The opening 27 through which the inflated substrate passes has been formed through mandrel 28 which is attached to the die housing 29. The path of the molten coating material 23 is indicated by the arrows in FIGS. 2 and 3. The vacuum chamber 21 puts a mild vacuum, e.g., in the range of from 0 to about 25 inches of water, on the die 22 to draw or pull up the extruded film 23 while it is still molten against the inflated tubing 10 to prevent the formation of occluded bubbles in the laminate 24. The vacuum chamber 22 can simply consist of the cylindrical housing whose inner diameter closely conforms to the outer diameter of the inflated tubing. A vacuum can be applied through outlet 30 by a conventional vacuum hose.

An alternate preferred barrier material is a saran liquid coating material of the type used to solvent or emulsion coat with saran rather than melt coat. This material can be substituted for the suspension polymerized saran of the previously described preferred barrier composition. It is believed that this liquid coating vinylidene polymer material acts in exactly the opposite manner from the suspension polymer saran, it has a lower melt viscosity and enhances the blend's flow in the manner of a lubricating effect. Liquid coating sarans are not thought of as being melt extrudable. In still other instances it has been found possible to substitute the liquid coating saran for all of the saran in the composition and melt extrude the composition and form a good film which has indeed been surprising. The liquid coating sarans are also usually emulsion polymerized but have established a distinctive character in the art.

The two-ply film 24 is passed to the coating or laminating die 32 preferably while still hot. In a discontinuous process it would be possible to cool or quench the tubing 24 prior to passing it to the second coating die 32 but this would also necessitate, in the usual instance, both a reinflation and a reheating of the tubing to obtain an excellent bond between the second ply and the first ply. The first ply considering the tubing from the outside thereof would be both an outer ply and the outer ply of the tubing.

A first tubular film, the third extruded in sequence, is melt extruded from the coating die 32 and coated on and directly adhered to the two-ply tubular film 24 to form a three-ply tubular film 34. Tubular film 33 is preferably of a composition chosen from those given when discussing tubular film 10 above. Although not necessarily of the same identical composition as tubular film 10, it would normally be identical as a matter of convenience in compounding. It may be seen that the coating process at die 32 is the same as that at die 22. The vacuum chamber 36 serves the same function as the vacuum chamber 21 and operates in the same manner with a vacuum being applied through outlet 37. The tubular film or ply 33 is 3–15 mils thick, more preferably 4–12 mils thick.

The three-ply tubular film laminate 34 is cooled or quenched by the water spray from cooling ring 39. The water is normally at about 45° F. Pinch rollers 40 then collapse the three-ply tubular film and the film is rolled onto wind-up roll 41. Alternatively in a continous process the film would not be rolled up onto wind-up roll 41 but would be delivered directly to the next step in the process sequence to stretch the film.

As shown in FIG. 1 a pay-out roll 42, which would be a previously prepared wound-up roll 41, is unwound over guide roll 43. The laminate 34 is substantially unstretched and unoriented as it passes over the guide roll 43. The film passes from guide roll 43 into a hot water bath tank 44 containing water 45. The preferred reheating temperature or hot water temperature is 160°–212° F, more preferably 180°–205° F. The collapsed three-ply tubular film is submerged in the hot water for a retention time of at least about 5 seconds. This is generally necessary to bring the film up to the desired temperature for orientation stretching. A typical retention time in the water bath is about 20 seconds. Guide rolls 47 guide the collapsed tubing through the water bath 45.

After the temperature of the three lamina of the tubing are adjusted to their proper orientation level, the bubble 46 is blown and the film is stretched in both the transverse and longitudinal directions in a preferred ratio of 1:1.5 – 1:6, more preferably 1:2 – 1:4 which would be a biaxial orientation of 1:2.25 – 1:3.60 and 1:4 – 1:16, respectively. Each of the coatings and the substrate are reduced substantially in equal proportions. It may be seen that the laminate is orientable out of hot water to produce the desired physical characteristics. The bubble 46 is maintained between pinch rolls 48 and 49. The tubing is collapsed by rollers 50 and the laminate is conveyed through pinch rollers 49 and across guide roll 51 and rolled onto wind-up roll 52. Idler roll 53 assures a good wind up.

Figure 4:
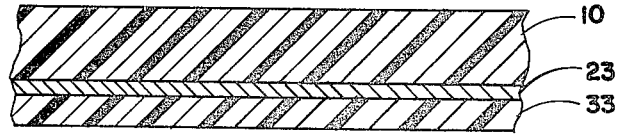
FIG. 4 is a cross sectional view of the laminate film of the present invention.

In FIG. 4, a cross section of the laminate 34 is illustrated, showing the third protective outer ply of plastic film 10 which is of course the inside ply of the tubing, barrier layer coating or intermediate ply of plastic film 23 and the first ply or coating or plastic film 33 which forms an outer protective ply for the laminate and outer protective coating of the tubular member. These three plies are directly joined without intermediate plies to form the three-ply laminate. The compositions of these plies will not be repeated here as they are clear from the previous description. After orientation the laminate film, which is shown in FIG. 4, has a preferred thickness of the third ply 10 of 0.5 to 5 mils, more preferably 1 to 2 mils, thickness of the intermediate ply 23 of 0.05–2 mils, more preferably 0.1–0.5 mils and a thickness of the outer ply 33 of 0.1–4 mils, more preferably 0.25–1 mils. The laminate has a preferred shrink tension of from 200–400 psi and a free shrink of at least 40% more preferably at least 50%, at 205° F and a free shrink of at least 20%, more preferably at least 30%, at 185° F.

In another preferred procedure of producing the laminate, the second and third applied coatings can be coextruded onto the preformed tubing from a coextension die. This would produce the same end laminate but is a somewhat The tubular film produced from the tubing of this invention produces an excellent barrier bag, the ply 10 bonding to itself very well at temperatures between 200° and 350° F without distorting substantially when the seals are produced with a thermal impulse sealer.

The ply 10 also gives excellent puncture strength. The thin saran based barrier layer provides the necessary barrier characteristics with a minimum thickness and expense. The outer layer of unirradiated polyethylene copolymer give high low temperature abuse resistance and improved tear resistance.

An advantageous method for employing bas made from the tubing of this invention is shown in U.S. Pat. No. 3,552,090. The bags are suitably closed after vacuumizing by clipping, for example, as shown in U.S. Pat. No. 3,383,746. A suitable vacuumizing device is shown in U.S. patent application Ser. No. 844,883, filed July 25, 1969, Dave L. Owen, inventor now U.S. Pat. No. 3,628,576. The just referred to patents and applications are all assigned to the same assignee as the patent application.

The laminate's optimum use and the use for which it was specifically designed, although it obviously would have many other uses, is as a packaging material for bone-in cuts of fresh red meat having exposed bones. When so employed the preferred and the most preferred laminate which is formed of the preferred and most preferred compositions is of almost critical importance. While an inferior laminate could be used employing for example a different barrier layer, this is at a substantial cost in processing ability and quality. The laminate is also nontoxic and food approved. It will be understood that when a bag is employed to package a piece of fresh red meat that has not been frozen and is not to be frozen but will be packaged and retained at low temperatures, e.g., 32°–45° F, the laminate encloses the bone-in cut of meat and exposed bones impinge against the inside protective ply of the bag which is an outside protective ply of the laminate.

In the preferred process, the bone-in meat is inserted into the three-ply laminate which is biaxially oriented and heat shrinkable. The laminate thus encloses a bone-in cut of meat and depending on the cut of meat may always be impinged against by an exposed bone. The bag is evacuated and sealed about the meat to preserve the vacuum. The bag is then heat shrunk taut on the meat and with the bone-in cut of meat forms a package that will preserve the meat for an extended period of time.

This invention provides an excellent means of preventing punctures and leakers in packaging bone-in cuts of meat in heat shrinkable plastic films because the inside coating of the plastic film which is exposed to the meat and bone is a polymer material having a substantial narrow molecular weight distribution that is solid at room temperature. The preferred polymer material for this coating is the composition given with respect to the first ply already described. By enclosing the meat in this film and forming a package and then applying heat to the package to shrink the film against the bone-in cut of meat, an excellent package can be formed. By using such a film with a good barrier layer, the meat may be protected in storage for extended periods of time.

In the preferred form of this invention, it is important that the irradiation dosage be within the confines set because this yields an adherent coating that has sufficient tensile strength to give good processiblity, good bone-puncture resistance and good orientability. Irradiation should be sufficient to increase the tensile strength without deteriorating elongation very much, as the material must stretch with the bone when packaging bonein cuts of fresh red meat. At the same time it is desirable that the bag cling to soft meat and to bone wherever the bone stricks out of the meat. Fresh red meat can be soft and allow the bone to move or "float" within it. If the film is irradiated too much, the elongation goes down and the bone will go right through on impact. If the vinyl acetate content is above that specified, the melting point of the polymer decreases adversely affecting the high temperature properties required for shrink packaging.

In addition to losing abuse resistance at shrink tunnel temperatures, the seals delaminate when the vinyl acetate content goes up much above 18% on this particular laminate. If the vinyl acetate drops down below 5%, the low temperature elasticity decreases and the modulus of elasticity increases to such an extent that the bag no longer functions as required for an efficient packaging operation.

The laminate has a number of very desirable characteristics, in its preferred form, including good shrinkability at a moderately raised temperature, an elongation of at least 50%, more preferably 100–125%, an oxygen transmission rate of no more than 70 cc/(1 sq.m./24 hrs./1 atm.) at 73° F, 0% r.h. (A.S.T.M. D 1434); and more preferably no more than 25 cc/(1 sq.m./ 24 hrs./

1 atm.) at 73° F, 0% r.h. (A.S.T.M. D 134). In its preferred form the film has a ball burst impact resistance of at least 25 cm-kg.

Various aspects of the invention can be employed independently or in ohter combinations with advantage over the materials normally so employed. The saran compositions can be formed into independent films. The compositions have the superior extrusion characteristics already enumerated whether being melt extrusion coated or melt extruded as independent self supporting films. Of course, to be self supporting the extruded saran film would have to be at least about 2-3 mils thick if extruded as a tubing using normal saran tube extrusion techniques. In addition it has been found that the saran film formed from a blend of emulsion and suspension polymerized saran was unexpected tear and puncture resistance for an oriented film when compared to existing known saran films.

In certain instances it might be desirable to substitute another polymer for the outer laminate or ply in a bag. This is the ply that needs to be resistant to scuff and tear abuse as against puncture resistance which is important for the inside ply of the preferred bag to be used in packaging bone-in fresh red meat. These polymers should also have relatively narrow molecular weight distribution, preferably with a generally random molecular weight distribution, most preferably in the general distribution of the standard bell curve. Examples of such polymers are polypropylene, polyamides, polyesters and the like, and copolymers, terpolymers and other polymers of such materials. Such groups of coating polymers are well known, however, the proper choosing of the polymer material with the right molecular weight characteristics is an aspect of this invention. Of course, in certain application the outer lamina or even the inner lamina might not need the advantages of this invention but the other lamina may be necessary and so the aspects of the invention are claimed both in the combination essential for best quality for the preferred application and independently for other applications or uses.

This invention is further illustrated by the following example:

EXAMPLE I

Following the procedure as schematically outlined in FIG. 1, an ethylene vinyl acetate copolymer containing 10% vinyl acetate having a melt index of about 2 and a molecular weight distribution as shown by line A of FIG. 5 and sold as UE 637 by U.S. Industrial Chemicals Division of National Distillers, is fed into the extruder hopper of extruder 9. The extruder is a 3.5 inch extruder and is operated at the following temperatures: rear zone, 250° F; mid-barrel 270° F; front barrel, 290° F; adaptor, 300° F; and die, 330° F. The screw rpm is 37 and the pressure is 3,800 psi. The die diameter is 3.5 inches and the tubing circumference produced is 8 inches. The water from the cooling ring 12 is 45° F. The pinch rolls 13 are operated at 35 feet per minute and the tubing thickness is approximately 18 mils.

The collapsed tubing is passed through an irradiation unit such as that depicted in FIG. 1 operated at 500 KEV, 20 MA and a speed of 35 feet per minute. Four passes are made and the tubing receives a dosage of about 6 megarads.

The irradiated substrate film is then passes to a coating die 22 where it is coated with a barrier material. The composition of the barrier layer is a lightly plasticized copolymer of vinylidene chloride and vinyl chloride. The copolymer is a mixture of 10% suspension polymerized and 90% emulsion polymerized copolymer. The emulsion polymerized copolymer consists of about 70% vinylidene chloride and 30% vinyl chloride and the suspension polymerized copolymer consists of about 80% vinyliene chloride and 20% vinyl chloride. These materials were purchased from Dow Chemical Company and are sold as UP 925 (emulsion polymerized resin) and SP 489 (suspension polymerized resin). The composition includes 5% of an epichlorohydrin/bisphenol A epoxy resin sold as EPON resin 828 by the Shell Chemical Company. It also includes about 0.5% of a microcrystalline paraffin wax purchased from Sun Chemical Company and sold as Wax 5512. The three resins are blended in a high speed, high intensity Prodex-Henschel blender and the blend is fed into the hopper of extruder 25 which is a 2 inch Prodex extruder operated with a cross head die of the type illustrated in FIGS. 2 and 3. The second extruder is operated at the following temperatures: rear zone, 210° F; mid-barrel, 260° F; front barrel, 300° F; adaptor, 285° F; and die 320° F. The screw rpm is 34 and the pressure is 5,500 psi. The die diameter is 3.5 inches and the tubing circumference is 8 inches. The top rolls 18 are operated at 35 fpm and the coating thickness is approximately 3 mils.

The second coating resin applied at extruder 35 is identical to the resin added to the hopper of the first extruder 9 and the extruder operating conditions are rear zone, 250° F; mid-barrel, 270° F; front barrel, 380° F; adaptor, 440° F; and die 450° F. In other respects the extruder's operation is the same as that set for extruder 9. The coating die 32 is of the same design as the coating die 22. The bottom rolls 40 are operated at 36 fpm and the water from the chill ring 39 is at 45° F. The coating thickness is approximately 6 mils.

Biaxial orientation is carried out by preheating in water at about 190° F as shown at 44 of FIG. 1 and passing the thus heated tubing through pinch rolls operating at 19 fpm to deflate rolls operating at 70 fpm and blowing the 4 inch wide tubing to produce a film width of approximately 16 inches with a film thickness of approximately 2.4 mils. This tubing is then rolled up on a storage roll which is then converted into bags by sealing the tubing transversely at intervals to form bottoms in conventional manner and severing the tubing into desired bag lengths.

EXAMPLE II

The above procedure was repeated except the barrier layer was varied by the addition of 2% of 2-ethyl hexyl diphenyl phosphate plasticizer purchased from Monsanto and identified as Santicizer 141 and reducing the epoxy resin content to 3%.

EXAMPLE III

The procedure of Example I was repeated except the barrier layer composition was 66% saran resin UP 925, 30% of a liquid coating saran resin purchased from Dow Chemical Company and sold as QX 2168, 2% Epon resin 828 and 2% Santicizer 141.

EXAMPLE IV

The procedure of Example III was repeated except the saran in the barrier layer composition was all QX 2168.

EXAMPLES V & VI

The procedures of Examples III and IV were repeated except a liquid coating saran sold by W. R. Grace & Co. as Daran CR 6795-H was substituted for the QX 2168.

EXAMPLE VII

The procedure of Example I was repeated except 5% of an epoxidized soybean oil (not an epoxy resin as defined herein) sold by Swift & Co. as Epoxol 7-3 was substituted for the 5% epoxy resin.

EXAMPLE VIII

The procedure of Example VII was repeated except 4% of 2-ethyl hexyl diphenyl phosphate plasticizer and 1% magnesium oxide were substituted for the 5% epoxy resin.

EXAMPLE IX

The procedure of Example I was repeated except a mixture of 53.3% by weight of isotactic polypropylene (Novamont* F007), 33.3% polybutene-1 (Mobil* PB 103) and 13.3% atactic polypropylene (Novamont" Lot 2030 is used to form the third layer. The acetic and isotactic polypropylene are first added in proper proportion to a banbury mixer and melt blended for approximately 8 minutes at 400° F. and then extruded into a sheet which is diced into pellets. These pellets are combined with pellets of polybutene-1 in a rotating drum and this admixture is charged to the hopper of extruder 35. Extruder 35 is operated at the following temperatures: rear zone, 385° F; mid-zone 400° F, forward zone, 450° F; adaptor, 400° F.; and die, 425° F.
*Novamont is a trademark of the Novamont Corp. and Mobil is a trademark of the Mobil Oil Co.

EXAMPLE X

The saran composition of Example II was extruded as a self supporting single layer film under the extrusion conditions set forth in Example II except 4% of the epoxy resin was used, and the UP 925 resin content was reduced 1%, an interior coating of propylene glycol was applied interiorly to prevent sticking when the tubing is collapsed prior to its biaxial orientation and the process was continuous, the bubble 46 being formed after collapse but without rolling the tubing up. In addition, the water bath was maintained at about 100° F, the extrusion gauge at about 5 mils and the biaxially oriented gauge at about 0.75 mils after a total orientation stretch ratio of about 12:1 biaxially. The film was found to have unexpected tear and puncture resistance for an oriented film when compared to existing known saran films.

PACKAGE ABUSE TESTS

The following test procedure was carried out, all test bags were precoded and conditioned for 24 hours at 45°–50° F. The bags are randomized and used to package full bone-in ribs weighing 25–30 pounds. The bags are 16 inches wide by 30 or 32 inches deep. The packages were vacuumized, clipped, shrunk and dried in an air blast. The packages are boxed in wax-coated corrugated shipping containers, three to a container. The shipping containers are then closed with nylon monofilament tape.

In the drop test the individual containers are dropped from a height of three feet from a moving conveyor. In the simulated motor freight shipment the containers are stored at 38° F for 24 hours and then shakes for 7.5 minutes at 1 g. on a L.A.B. Vibration tester* — sincrenois motion — to simulate a 125-mile truck shipment.
*Trademark of L.A.B. Corporation In both tests the packages are pumped with air and submerged under water to determine leakage which is rated as failure.

TABLE I

| BAG | LAMINATE GAUGE | BONE PUNCTURE RESISTANCE % SURVIVAL | SHIPPING ABUSE (BONE-IN) % SURVIVAL | OXYGEN BARRIER cc(1 sq.m./24 hrs./1 atm.) |
|---|---|---|---|---|
| Made in Substantial Conformance with Example I | 2.4 | 75% | 82% | 45 |
| Made in Substantial Conformance with Example I | 2.7 | 73% | 92% | 40–45 |
| Made in Substantial Conformance with Example II | 2.0 | 63% | 80% | 35 |
| Standard Saran Bag Produced by W. R. Grace & Co. | 1.9 | 25% | 45% | 150 |
| Standard Saran Bag Purchased from Union Carbide | | 23.3% | 36.6% | 150 |

We claim:

1. A method of forming a film from a copolymer of vinylidene chloride and vinyl chloride having a vinyl chloride content of 5–15 weight percent, said copolymer comprising from 5 to 100 weight percent of a liquid coating grade polymer having a lower melt viscosity than copolymers of vinylidene chloride and vinyl chloride normally used in melt extrusion processes, comprising the steps of:
   introducing said copolymer into an extruder;
   extruding said copolymer through an annular die to form a tubular film having a thickness of 1–5 mils; and
   cooling said film to form a self-supporting film, the barrell on said extruder being maintained in the temperature range of 200°–320° F and the extrusion die being maintained in the temperature range of 280°–340° F.

2. The method of claim 1 wherein said liquid coating grade copolymer is blended with a melt extrusion grade, emulsion polymerized copolymer of vinylidene chloride having at least 50% vinylidene chloride to form a blend prior to introduction into the extruder.

3. The method of claim 2 wherein said liquid coating grade and melt extrusion grade copolymers are further blended with 2–10% epoxy resin.

* * * * *

UNITED STATES PATENT OFFICE
CERTIFICATE OF CORRECTION

Patent No. 4,082,829          Dated 4/04/78

Inventor(s) Harri J. Brax; Joseph F. Porinchak; Alan S. Weinberg

It is certified that error appears in the above-identified patent and that said Letters Patent are hereby corrected as shown below:

Column 11, Example VII, line 3, delete "3" and insert ---4---.

Column 11, Example IX, line 5, delete "acetic" and insert ---atatic---.

Signed and Sealed this

Twenty-second Day of January 1980

[SEAL]

Attest:

SIDNEY A. DIAMOND

Attesting Officer      Commissioner of Patents and Trademarks